United States Patent
Kim et al.

(10) Patent No.: US 9,321,344 B2
(45) Date of Patent: Apr. 26, 2016

(54) TRANSMISSION SYSTEM OF HYBRID ELECTRIC VEHICLE

(71) Applicant: Hyundai Motor Company, Seoul (KR)

(72) Inventors: Baekyu Kim, Whasung-Si (KR); SeongGon Byun, Whasung-Si (KR); Chulmin Ahn, Whasung-Si (KR); Kwangmin Choi, Whasung-Si (KR); Tae Sic Park, Whasung-Si (KR); Seok Joon Kim, Whasung-Si (KR); Jun Hoi Huh, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 12 days.

(21) Appl. No.: 14/293,634

(22) Filed: Jun. 2, 2014

(65) Prior Publication Data
US 2015/0051036 A1 Feb. 19, 2015

(30) Foreign Application Priority Data
Aug. 13, 2013 (KR) .................. 10-2013-0096142

(51) Int. Cl.
| | | |
|---|---|---|
| *B60K 6/50* | (2007.10) | |
| *B60K 6/36* | (2007.10) | |
| *B60K 6/442* | (2007.10) | |
| *B60K 6/547* | (2007.10) | |
| B60K 6/48 | (2007.10) | |
| *F16H 1/22* | (2006.01) | |
| *B60K 6/42* | (2007.10) | |

(52) U.S. Cl.
CPC ... *B60K 6/50* (2013.01); *B60K 6/36* (2013.01); *B60K 6/442* (2013.01); *B60K 6/547* (2013.01); *B60K 6/42* (2013.01); *B60K 2006/4816* (2013.01); *F16H 1/22* (2013.01); *F16H 2700/06* (2013.01); *Y10S 903/902* (2013.01)

(58) Field of Classification Search
CPC .... B60K 6/42; B60K 6/50; B60K 2006/4816; F16H 1/22; F16H 2700/06
See application file for complete search history.

(56) References Cited

U.S. PATENT DOCUMENTS

| 6,910,981 B2 | 6/2005 | Minagawa et al. |
| 7,086,977 B2 | 8/2006 | Supina et al. |

(Continued)

FOREIGN PATENT DOCUMENTS

| JP | 4217258 B2 | 11/2008 |
| JP | 2013-203230 A | 10/2013 |

(Continued)

*Primary Examiner* — Derek D Knight
*Assistant Examiner* — David Morris
(74) *Attorney, Agent, or Firm* — Morgan, Lewis & Bockius LLP (57) ABSTRACT

A transmission system of a hybrid electric vehicle may include two shafts, two hollow shafts and two motor/generators. A first shaft connected to an engine. A first hollow shaft disposed without rotational interference with the first shaft, selectively connected to the first shaft, and provided with a first output gear. A second hollow shaft disposed without rotational interference with the first hollow shaft and provided with a second output gear. A second shaft disposed in parallel with the first shaft and operably connected to the first shaft and the first hollow shaft through a gear unit to selectively transmit torque of the first shaft to the first hollow shaft. Clutches may connect the first shaft and the second shaft selectively to the first hollow shaft. A first motor/generator operably connected to the second hollow shaft and a second motor/generator operably connected to the second shaft.

16 Claims, 8 Drawing Sheets

(56) References Cited

U.S. PATENT DOCUMENTS

| | | | |
|---|---|---|---|
| 7,678,003 B2 | 3/2010 | Janson et al. | |
| 8,337,352 B2 | 12/2012 | Morrow et al. | |
| 8,430,190 B2 | 4/2013 | Honda et al. | |
| 2010/0170732 A1* | 7/2010 | Glaser et al. | 180/65.245 |
| 2011/0036652 A1 | 2/2011 | Honda et al. | |
| 2015/0051036 A1 | 2/2015 | Kim et al. | |

FOREIGN PATENT DOCUMENTS

| | | |
|---|---|---|
| KR | 10-2005-0045596 A | 5/2005 |
| KR | 10-2010-0124330 A | 11/2010 |
| KR | 10-1416420 B1 | 7/2014 |

* cited by examiner

| Drive mode | | CL1 | CL2 |
|---|---|---|---|
| EV mode | | | |
| Starting of engine | | | |
| Continuous mode | | | |
| Parallel mode | Direct-coupling (including ud, 1:1, od) | ○ | |
| | OD | | ○ |

TRANSMISSION SYSTEM OF HYBRID ELECTRIC VEHICLE

CROSS-REFERENCE TO RELATED APPLICATION

The present application claims priority of Korean Patent Application Number 10-2013-0096142 filed on Aug. 13, 2013, the entire contents of which application are incorporated herein for all purposes by this reference.

BACKGROUND OF INVENTION

1. Field of Invention

The present invention relates to a transmission system of a hybrid electric vehicle. More particularly, the present invention relates to a transmission system of a hybrid electric vehicle that can achieve electric vehicle (EV) mode, continuous mode and parallel mode including direct-coupling and overdrive (OD).

2. Description of Related Art

Generally, a hybrid vehicle is a vehicle which uses two different power sources efficiently. Such a hybrid electric vehicle typically uses an engine and a motor/generator. The hybrid electric vehicle uses the motor/generator having relatively better low-speed torque characteristics as a main power source at a low-speed and uses an engine having relatively better high-speed torque characteristics as a main power source at a high-speed. Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle. Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depend on connections of the planetary gear sets, the motor/generators, and the torque delivery apparatus. In addition, the power transmission system of the multi-mode type has different features such a durability, power delivery efficiency, and size depend on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a transmission system of a hybrid electric vehicle having advantages of achieving EV mode, continuous mode and parallel mode including direct-coupling and OD by disposing two motor/generators and two clutches on a first shaft.

In addition, the present invention has been made in an effort to provide a transmission system of a hybrid electric vehicle having further advantages of enhancing fuel economy by not using clutches at modes other than parallel mode.

In addition, the present invention has been made in an effort to provide a transmission system of a hybrid electric vehicle having further advantages of reducing capacity of a motor/generator for driving as well as enhancing fuel economy since continuous mode is unnecessary at high-speed region by adding parallel mode including direct-coupling.

In addition, the present invention has been made in an effort to provide a transmission system of a hybrid electric vehicle having further advantages of shortening a length of the transmission system by disposing a motor/generator for generating on a second shaft and disposing two clutches in a space secured by removing a planetary gear set.

A transmission system of a hybrid electric vehicle according to various aspects of the present invention may include: a first shaft connected to an engine; a first hollow shaft disposed without rotational interference with the first shaft, selectively connected to the first shaft, and provided with a first output gear; a second hollow shaft disposed without rotational interference with the first hollow shaft and provided with a second output gear; a second shaft disposed in parallel with the first shaft and operably connected to the first shaft and the first hollow shaft through a gear unit so as to selectively transmit torque of the first shaft to the first hollow shaft; clutches connecting the first shaft and the second shaft selectively to the first hollow shaft; a first motor/generator operably connected to the second hollow shaft; and a second motor/generator operably connected to the second shaft.

The transmission system may further include a reduction gear unit transmitting torque of the first hollow shaft or the second hollow shaft to a differential apparatus. The reduction gear unit may include an intermediate shaft disposed in parallel with the first shaft between the differential apparatus and the first shaft, a first intermediate gear provided on the intermediate shaft and engaged with the first output gear, a second intermediate gear provided on the intermediate shaft and engaged with the second output gear, and a drive gear provided on the intermediate shaft and engaged with a final reduction gear of the differential apparatus.

The gear unit may include a first externally-meshing drive gear provided on the first shaft, a first externally-meshing driven gear provided on the second shaft and engaged with the first externally-meshing drive gear, a second externally-meshing drive gear provided on the second shaft, and a second externally-meshing driven gear selectively connected to the first hollow shaft and engaged with the second externally-meshing drive gear. The gear unit may be adapted to increase a rotation speed of the first shaft and to selectively transmit the increased rotation speed to the first hollow shaft.

In some aspects, the clutches may include a first clutch disposed between the first shaft and the first hollow shaft, and a second clutch disposed in the gear unit operably connecting the second shaft with the first hollow shaft. In other aspects, the clutches may include a first clutch disposed between the first shaft and the first hollow shaft, and a second clutch disposed between the first hollow shaft and the second externally-meshing driven gear of the gear unit.

The first motor/generator may be used to drive the vehicle and the second motor/generator may be used to generate electricity.

In some aspects, the second motor/generator may be disposed on a middle portion of the second shaft. In other aspects, the second motor/generator may be disposed on one end portion of the second shaft.

In various other aspects, the transmission system may further include a variable connection unit dividing the second shaft into two pieces and selectively connecting the divided two pieces. The variable connection unit may be a synchronizer. The transmission system may further include a damper disposed between the engine and the first shaft.

A transmission system of a hybrid electric vehicle according to various other aspects of the present invention may include: a first shaft connected to an engine; a first hollow shaft disposed without rotational interference with the first shaft and selectively and operably connected to the first shaft; a second hollow shaft disposed without rotational interference with the first hollow shaft; a second shaft disposed in parallel with the first shaft; first and second output gears disposed respectively on the first and second hollow shafts and respectively outputting torques of the first and second hollow shafts; a gear unit disposed on the first shaft, the first hollow shaft, and the second shaft, and selectively transmitting torque of the first shaft to the first hollow shaft through the second shaft; clutches connecting the first shaft and the second shaft selectively to the first hollow shaft; a first motor/generator operably connected to the second hollow shaft; and a second motor/generator operably connected to the second shaft.

The transmission system may further include a reduction gear unit transmitting torque of the first hollow shaft or the second hollow shaft to a differential apparatus. The reduction gear unit may include an intermediate shaft disposed in parallel with the first shaft between the differential apparatus and the first shaft, a first intermediate gear provided on the intermediate shaft and engaged with the first output gear, a second intermediate gear provided on the intermediate shaft and engaged with the second output gear, and a drive gear provided on the intermediate shaft and engaged with a final reduction gear of the differential apparatus.

The gear unit may include a first externally-meshing drive gear provided on the first shaft, a first externally-meshing driven gear provided on the second shaft and engaged with the first externally-meshing drive gear, a second externally-meshing drive gear provided on the second shaft, and a second externally-meshing driven gear selectively connected to the first hollow shaft and engaged with the second externally-meshing drive gear.

The clutches may include a first clutch disposed between the first shaft and the first hollow shaft, and a second clutch disposed in the gear unit operably connecting the second shaft with the first hollow shaft.

The transmission system may further include a variable connection unit dividing the second shaft into two pieces and selectively connecting the divided two pieces. The transmission system may further include a damper disposed between the engine and the first shaft.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present exemplary embodiments will be omitted, and the same constituent elements are denoted by the same reference numerals in this specification. In the detailed description, ordinal numbers are used for distinguishing constituent elements having the same terms, and have no specific meanings.

Figure 1:
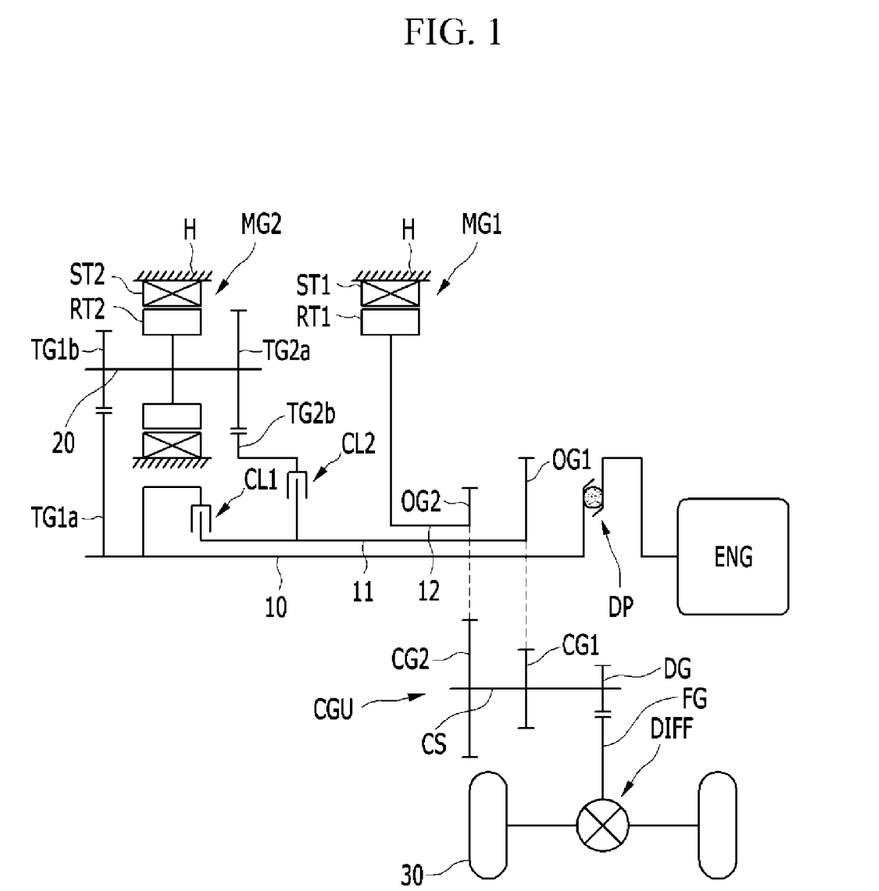
FIG. 1 is a schematic diagram of an exemplary transmission system of a hybrid electric vehicle according to the present invention.

FIG. 1 is a schematic diagram of a transmission system of a hybrid electric vehicle according to a first exemplary embodiment of the present invention. Referring to FIG. 1, a transmission system of a hybrid electric vehicle according to a first exemplary embodiment of the present invention changes torques of an engine ENG and first and second motor/generators MG1 and MG2 according to running state of a vehicle and outputs the changed torque through first and second output gears OG1 and OG2.

The transmission system includes a first shaft 10, first and second hollow shafts 11 and 12, the first and second motor/generators MG1 and MG2, second shaft 20, first and second clutches CL1 and CL2, and a reduction gear unit CGU.

One side of the first shaft 10 is connected to an output side of the engine ENG such that the first shaft 10 receives driving torque of the engine. In the first exemplary embodiment of the present invention, a damper DP for absorbing bending impact is disposed between the output side of the engine ENG and the one side of the first shaft 10.

In addition, the first and second hollow shafts 11 and 12 are disposed at a radial outside of the first shaft 10. The first shaft 10 and the first and second hollow shafts 11 and 12 are so arranged that rotational interference does not occur among the first shaft 10 and the first and second hollow shafts 11 and 12.

A first output gear OG1 is mounted at an end of the first hollow shaft 11 and a second output gear OG2 is mounted at an end of the second hollow shaft 12. In addition, the first output gear OG1 and the second output gear OG2 are spaced axially by a predetermined distance, and a diameter of the first output gear OG1 is relatively larger than that of the second output gear OG2.

The first motor/generator MG1 and the second motor/generator MG2 are independent power sources and are operated as a motor and/or a generator. The first motor/generator MG1 includes a first rotor RT1 and a first stator ST1. The first rotor RT1 is connected to the second hollow shaft 12 and the first stator ST1 is fixed to a transmission housing H such that the first motor/generator MG1 is used as a motor for driving the vehicle. The second motor/generator MG2 includes a second rotor RT2 and a second stator ST2. The second rotor RT2 is connected to the second shaft 20 and the second stator ST2 is fixed to the transmission housing H such that the second motor/generator MG2 is used as a generator.

The second shaft 20 is disposed in parallel or substantially in parallel with and apart from the first shaft 10 and is operably connected to the first shaft 10 and the first hollow shaft 11 through a gear unit. Therefore, the second shaft 20 receives torque of the first shaft 10 and selectively transmits the torque to the first hollow shaft 11. At this time, rotation speed of the second shaft 20 is faster than that of the first shaft 10.

Herein, the gear unit includes a first externally-meshing drive gear TG1a disposed on the other side of the first shaft 10 and a first externally-meshing driven gear TG1b disposed on the other side of the second shaft 20 and engaged with the first externally-meshing drive gear TG1a.

In addition, a second externally-meshing drive gear TG2a is provided on one side of the second shaft 20 and a second externally-meshing driven gear TG2b is provided on the other side of the first hollow shaft 11 such that the second shaft 20 is adapted to be selectively connected to the first hollow shaft 11. Herein, the second externally-meshing drive gear TG2a and the second externally-meshing driven gear TG2b are engaged with each other.

The gear unit is adapted to selectively transmit the torque of the first shaft 10 to the first hollow shaft 11. At this process, the rotation speed of the first shaft 10 increases. That is, a diameter of the first externally-meshing driven gear TG1b is relatively smaller than that of the second externally-meshing drive gear TG2a. At this time, the second motor/generator MG2 is disposed on the second shaft 20 between the first externally-meshing driven gear TG1b and the second externally-meshing drive gear TG2a.

In addition, the first clutch CL1 and the second clutch CL2 are adapted to transmit torque and are disposed in a space formed between the first shaft 10 and the second shaft 20. That is, the first clutch CL1 is disposed between the first shaft 10 and the first hollow shaft 11 so as to selectively connect the first shaft 10 with the first hollow shaft 11. If the first clutch CL1 is operated, the first shaft 10 and the first hollow shaft 11 are connected such that the torque of the engine ENG is input to the first output gear OG1 without changing in the rotation speed.

In addition, the second clutch CL2 is disposed between the first hollow shaft 11 and the second externally-meshing driven gear TG2b so as to selectively connect the second shaft 20 with the first hollow shaft 11. If the second clutch CL2 is operated, the torque of the first shaft 10 is selectively transmitted to the first hollow shaft 11 through the second shaft 20 and is input to the first output gear OG1. At this process, the rotation speed of the first shaft 10 increases.

In addition, the first and second clutches CL1 and CL2 may be conventional multi-plate friction elements of wet type that are operated by hydraulic pressure, and selectively connect a rotation element with another rotation element.

In addition, the first and second output gears OG1 and OG2 are connected to a final reduction gear FG of a differential apparatus DIFF through a reduction gear unit CGU. The reduction gear unit CGU decreases rotation speeds of the first and second output gears OG1 and OG2 and transmits the decreased rotation speeds to the final reduction gear FG.

The reduction gear unit CGU includes an intermediate shaft CS disposed in parallel or substantially in parallel with the first shaft 10 between the first shaft 10 and the differential apparatus DIFF. In addition, the reduction gear unit CGU further includes a first intermediate gear CG1 disposed on the intermediate shaft CS and engaged with the first output gear OG1, a second intermediate gear CG2 disposed on the intermediate shaft CS and engaged with the second output gear OG2, and a drive gear DG disposed on the intermediate shaft CS and engaged with the final reduction gear FG of the differential apparatus DIFF. The first intermediate gear CG1, the second intermediate gear CG2 and the drive gear DG are disposed in a sequence of the drive gear DG, the first intermediate gear CG1 and the second intermediate gear CG2.

Since diameters of the first and second intermediate gears CG1 and CG2 are larger than that of the drive gear DG, the reduction gear unit CGU decreases rotation speeds of the first and second output gears OG1 and OG2 and transmits the decreased rotation speed to the final reduction gear FG. Thereby, the driving wheel 30 is driven.

The transmission system of the hybrid electric vehicle according to the first exemplary embodiment of the present invention includes a power delivery path through which driving torque of the first motor/generator MG1 is transmitted to the driving wheel 30 so as to run the vehicle, and a power delivery path through which the driving torque of the engine ENG is transmitted to the driving wheel 30 so as to run the vehicle. Therefore, the transmission system runs the vehicle by using any one of the two power delivery paths or both of the power delivery paths selectively.

In addition, in a case that the driving torque of the engine ENG is transmitted to the driving wheel 30, a power delivery path where the first clutch CL 1 is operated and the first shaft 10 and the first hollow shaft 11 are directly connected, and a power delivery path where the second clutch CL2 is operated and the first shaft 10 is connected to the first hollow shaft 11 through the second shaft 20 are included.

Figure 2:
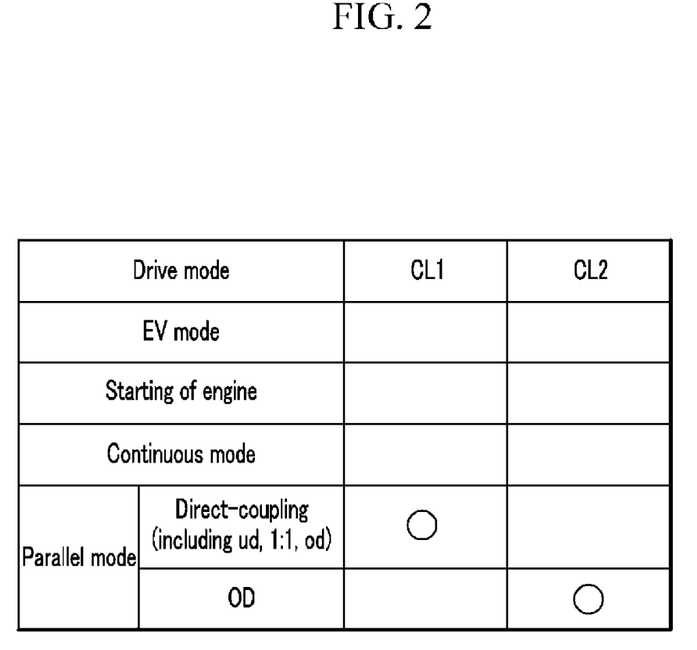
FIG. 2 is an operational chart of friction elements at each mode applied to an exemplary transmission system of a hybrid electric vehicle according to the present invention.

FIG. 2 is an operational chart of friction elements at each mode applied to a transmission system of a hybrid electric vehicle according to a first exemplary embodiment of the present invention. Referring to FIG. 2, the transmission system of the hybrid electric vehicle according to the first exemplary embodiment of the present invention can achieve EV mode, continuous mode, and parallel mode including direct-coupling and OD.

That is, both of the first and second clutches CL1 and CL2 are released at the EV mode and the continuous mode, the first clutch CL1 is operated at the direct-coupling of the parallel mode, and the second clutch CL2 is operated at the OD of the parallel mode.

At this time, under drive, direct-coupling drive and over drive can be achieved according to gear ratios of the first and second intermediate gears CG1 and CG2 of the reduction gear unit CGU engaged with the first and second output gears OG1 and OG2 and the drive gear DG at the direct-coupling of the parallel mode.

Hereinafter, flow of torque at each mode in the transmission system of the hybrid electric vehicle according to the first exemplary embodiment of the present invention will be described, referring to FIG. 3 to FIG. 6.

Figure 3:
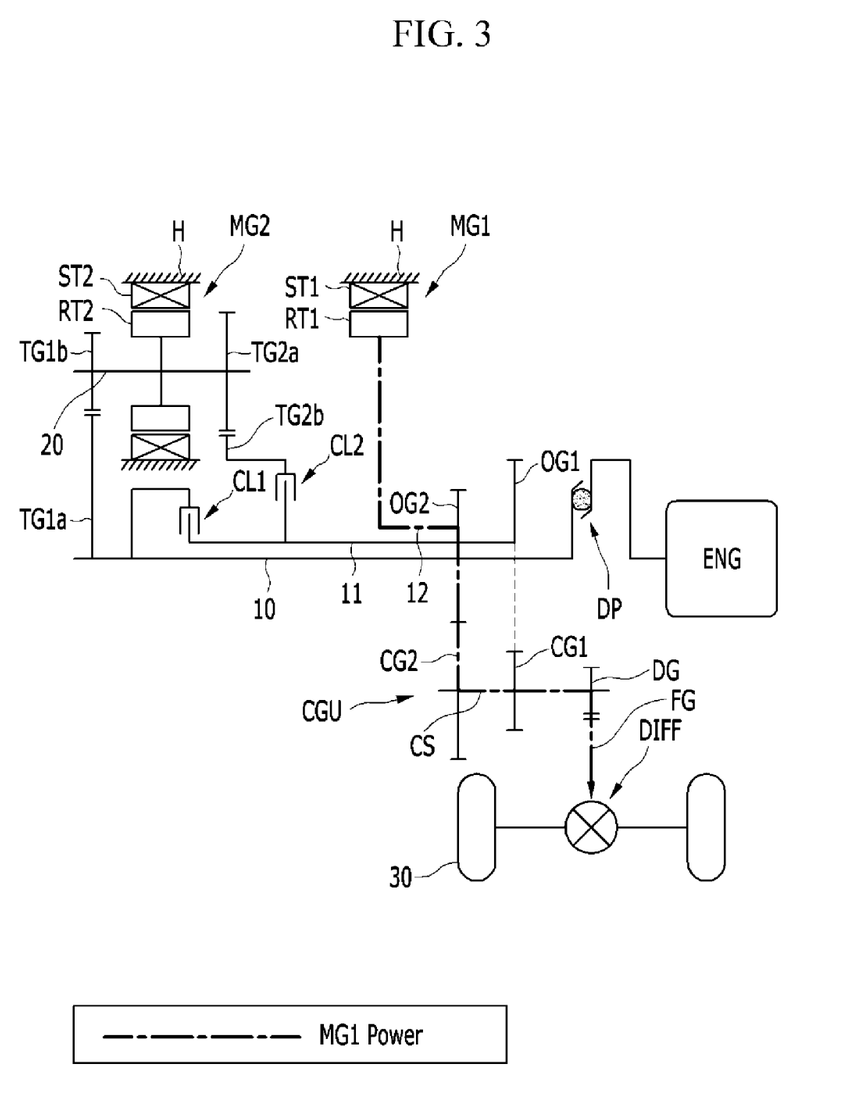
FIG. 3 is a schematic diagram for illustrating flow of power at EV mode in an exemplary transmission system of a hybrid electric vehicle according to the present invention.

FIG. 3 is a schematic diagram for illustrating flow of power at EV mode in a transmission system of a hybrid electric vehicle according to a first exemplary embodiment of the present invention. Referring to FIG. 3, all the clutches are released at the EV mode.

The engine ENG is stopped and the driving torque of the first motor/generator MG1 is transmitted to the final reduction gear FG of the differential apparatus DIFF through the second hollow shaft 12, the second output gear OG2, the second intermediate gear CG2, the intermediate shaft CS, and the drive gear DG at the EV mode. At this process, the rotation speed of the first motor/generator MG1 decreases. That is, the driving wheel 30 is driven by the driving torque of the first motor/generator MG1 at the EV mode.

Therefore, electrically continuously variable shift may be achieved by controlling the rotation speed of the first motor/generator MG1.

Figure 4:
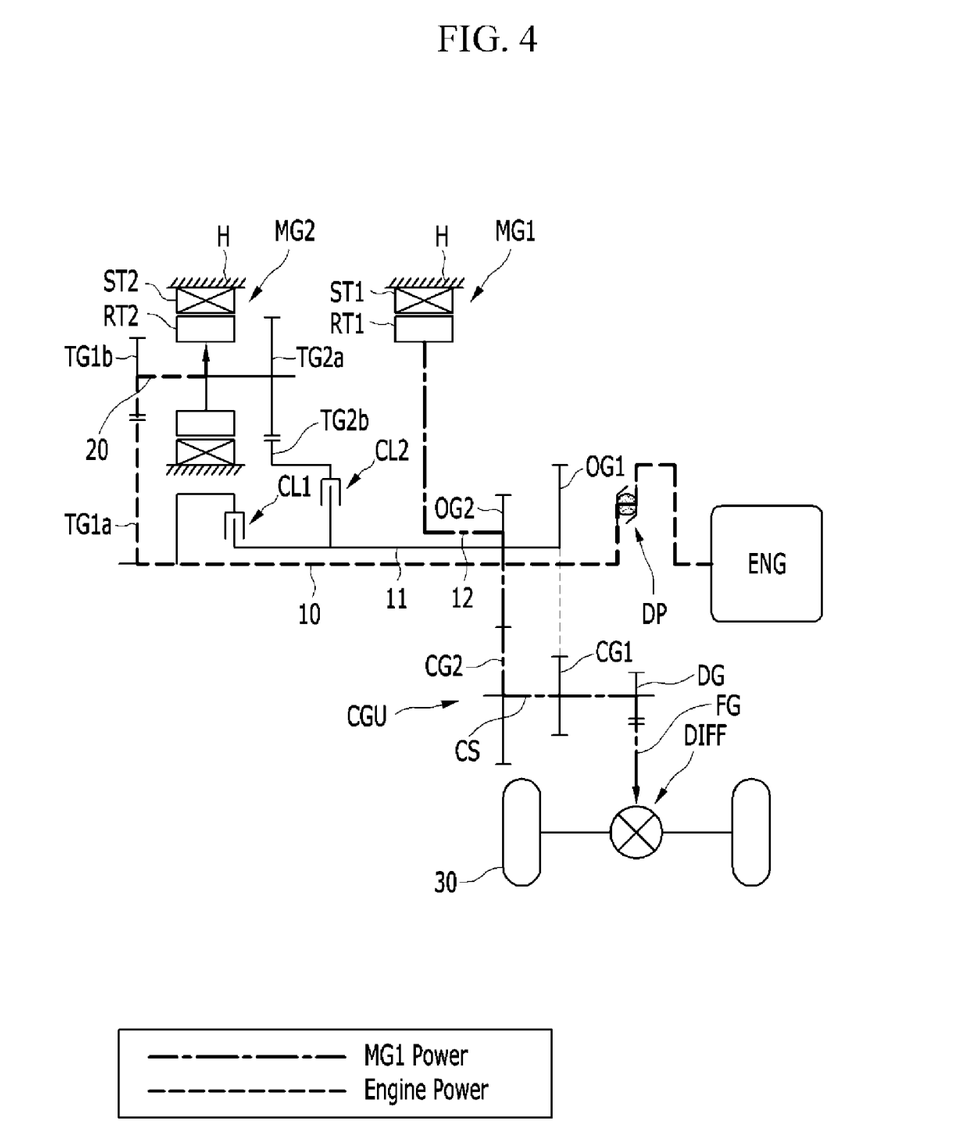
FIG. 4 is a schematic diagram for illustrating flow of power at continuous mode in an exemplary transmission system of a hybrid electric vehicle according to the present invention.

FIG. 4 is a schematic diagram for illustrating flow of power at continuous mode in a transmission system of a hybrid electric vehicle according to a first exemplary embodiment of the present invention. Referring to FIG. 4, all the clutches are released at the continuous mode.

If the engine Eng is started at the EV mode, the continuous mode is achieved. At the continuous mode, the driving torque of the engine ENG is transmitted to the second motor/generator MG2 through the first shaft 10 and the second shaft 20. At this process, the rotation speed of the engine ENG increases. In addition, electricity generated by the second motor/generator MG2 is supplied to the first motor/generator MG1 as drive power at the continuous mode.

At this time, the engine ENG is started by the second motor/generator MG2. That is, even though the engine ENG is operated, the driving torque of the engine ENG is not directly transmitted to the driving wheel 30 but is transmitted to the second motor/generator MG2 such that the second motor/generator MG2 generates the electricity.

Meanwhile, the second motor/generator MG2 is operated such that the driving torque of the second motor/generator MG2 is transmitted to the engine ENG through the first externally-meshing driven gear TG1b on the second shaft 20, the first externally-meshing drive gear TG1a on the first shaft 10, and the first shaft 10. Therefore, starting of the engine ENG is achieved. At this process, the rotation speed of the second motor/generator MG2 decreases.

After the engine ENG is started, the second motor/generator MG2 does not operate and generates electricity by the torque of the engine ENG.

The driving torque of the first motor/generator MG1 is transmitted to the final reduction gear FG of the differential apparatus DIFF through the second hollow shaft 12, the second output gear OG2, the second intermediate gear CG2, the intermediate shaft CS, and the drive gear DG at the continuous mode, the same as the EV mode. At this process, the rotation speed of the first motor/generator MG1 decreases. That is, the driving wheel 30 is driven by the driving torque of the first motor/generator MG1 at the continuous mode.

In addition, electrically continuously variable shift may be achieved by controlling the rotation speed of the first motor/generator MG1.

At this time, the first motor/generator MG1 uses the electricity generated by the second motor/generator MG2 as the drive power. In addition, remaining electricity is charged in the battery.

Figure 5:
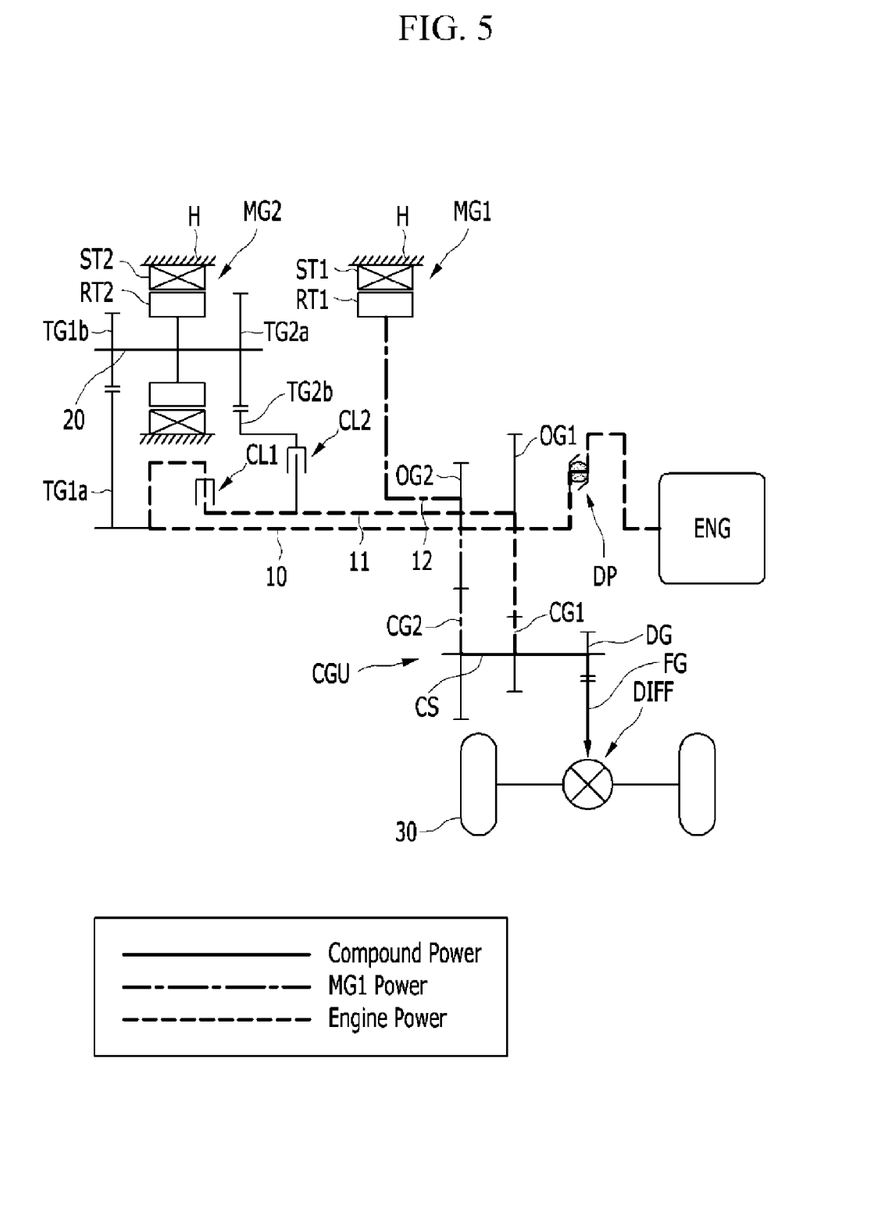
FIG. 5 is a schematic diagram for illustrating flow of power at direct-coupling of parallel mode in an exemplary transmission system of a hybrid electric vehicle according to the present invention.

FIG. 5 is a schematic diagram for illustrating flow of power at direct-coupling of parallel mode in a transmission system of a hybrid electric vehicle according to a first exemplary embodiment of the present invention. Referring to FIG. 5, the first clutch CL1 is operated at the direct-coupling of the parallel mode.

The torque of the engine ENG is used as main power, and the torque of the first motor/generator MG1 is used as auxiliary power at the direct-coupling of the parallel mode. That is, the torque of the engine ENG is supplied as the main power to the first output gear OG1 through the first shaft 10 by operation of the first clutch CL1, and the torque of the first motor/generator MG1 is transmitted to the second output gear OG2 as the auxiliary power. At this time, a portion of the torque of the engine ENG may be involved in the power generation of the second motor/generator MG2.

The electrically continuously variable shift may be achieved by the torque of the engine ENG transmitted to the first output gear OG1 through the first shaft 10 and the first hollow shaft 11 and the torque of the first motor/generator MG1 transmitted to the second output gear OG2 through the second hollow shaft 12 at the direct-coupling of the parallel mode.

As described above, the torques of the engine ENG and the first motor/generator MG1 input to the first and second output gears OG1 and OG2 are transmitted to the final reduction gear FG of the differential apparatus DIFF through the first and second intermediate gears CG1 and CG2 and the drive gear DG. That is, the driving wheel 30 is driven by the driving torques of the engine ENG and the first motor/generator MG1 at the direct-coupling of the parallel mode.

Figure 6:
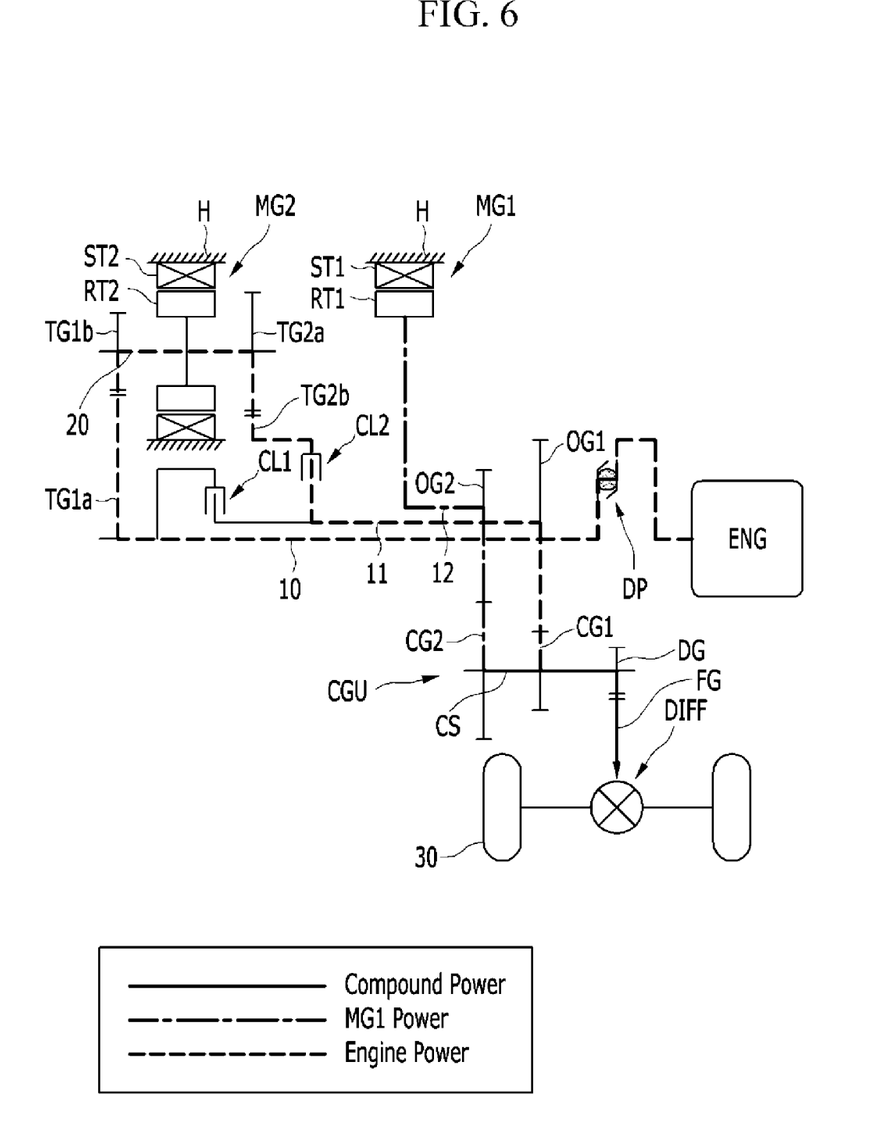
FIG. 6 is a schematic diagram for illustrating flow of power at OD of parallel mode in an exemplary transmission system of a hybrid electric vehicle according to the present invention.

FIG. 6 is a schematic diagram for illustrating flow of power at OD of parallel mode in a transmission system of a hybrid electric vehicle according to a first exemplary embodiment of the present invention. Referring to FIG. 6, the second clutch CL2 is operated at the OD of the parallel mode.

The torque of the engine ENG is used as main power, and the torque of the first motor/generator MG1 is used as auxiliary power at the OD of the parallel mode. That is, the torque of the engine ENG is transmitted to the first output gear OG1 as the main power through the first shaft 10, the second shaft 20, and the first hollow shaft 11 by operation of the second clutch CL2, and the torque of the first motor/generator MG1 is transmitted to the second output gear OG2 as the auxiliary power through the second hollow shaft 12.

At this time, a portion of the torque of the engine ENG may be involved in the power generation of the second motor/generator MG2.

The electrically continuously variable shift may be achieved by the torque of the engine ENG transmitted to the first output gear OG1 through the first shaft 10, the second shaft 20, and the first hollow shaft 11 and the torque of the first motor/generator MG1 transmitted to the second output gear OG2 through the second hollow shaft 12 at the OD of the parallel mode.

As described above, the torques of the engine ENG and the first motor/generator MG1 input to the first and second output gears OG1 and OG2 are transmitted to the final reduction gear FG of the differential apparatus DIFF through the first and second intermediate gears CG1 and CG2 and the drive gear DG. That is, the driving wheel 30 is driven by the driving torques of the engine ENG and the first motor/generator MG1 at the OD of the parallel mode.

In addition, since a diameter of the first externally-meshing driven gear TG1b is relatively smaller than that of the second externally-meshing drive gear TG2a on the second shaft 20, the rotation speed of the engine ENG increases.

As described above, all of the engine ENG, the first motor/generator MG1 and the second motor/generator MG2 can generate driving torque, the second motor/generator MG2 can generate electricity by using the torque of the engine ENG, and continuous gear ratios required in the vehicle can be formed by control of the first motor/generator MG1 in the transmission system of the hybrid electric vehicle according to the exemplary embodiment of the present invention. Therefore, fuel economy may be improved.

That is, the EV mode, the continuous mode and the parallel mode including the direct-coupling and the OD can be achieved by disposing two motor/generators MG1 and MG2 and two clutches CL1 and CL2 on the first shaft 10.

In addition, since the clutch is not used at modes other than the parallel mode, operating pressure applied to the clutches can be minimized and fuel economy may be improved. In addition, since the direct-coupling is added in the parallel mode, fuel economy may be enhanced and capacity of the first motor/generator MG1 may be reduced. In addition, since the second motor/generator MG2 for generating electricity is disposed on the second shaft 20 and two clutches CL1 and CL2 are disposed in the space attained by removing the planetary gear set, a length of the transmission system may be shortened.

Figure 7:
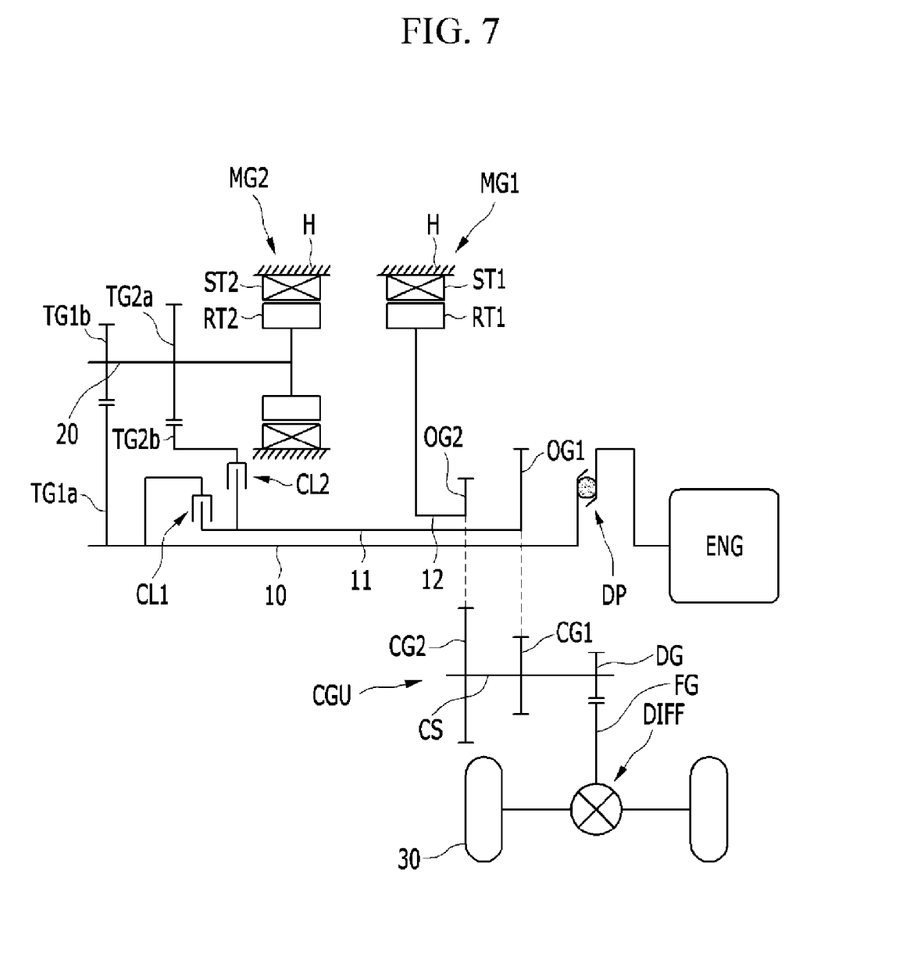
FIG. 7 is a schematic diagram of another exemplary transmission system of a hybrid electric vehicle according to the present invention.

FIG. 7 is a schematic diagram of a transmission system of a hybrid electric vehicle according to a second exemplary embodiment of the present invention. Referring to FIG. 7, the second motor/generator MG2 is disposed on the second shaft 20 between the first externally-meshing driven gear TG1b and the second externally-meshing drive gear TG2a in the first exemplary embodiment, but the second motor/generator MG2 is disposed on one end portion of the second shaft 20 in the second exemplary embodiment.

That is, the second motor/generator MG2 is disposed at an opposite side of the first externally-meshing driven gear TG1b with respect to the second externally-meshing drive gear TG2a. Since functions of the second exemplary embodiment are the same as those of the first exemplary embodiment except the position of the second motor/generator MG2, detailed description thereof will be omitted.

Figure 8:
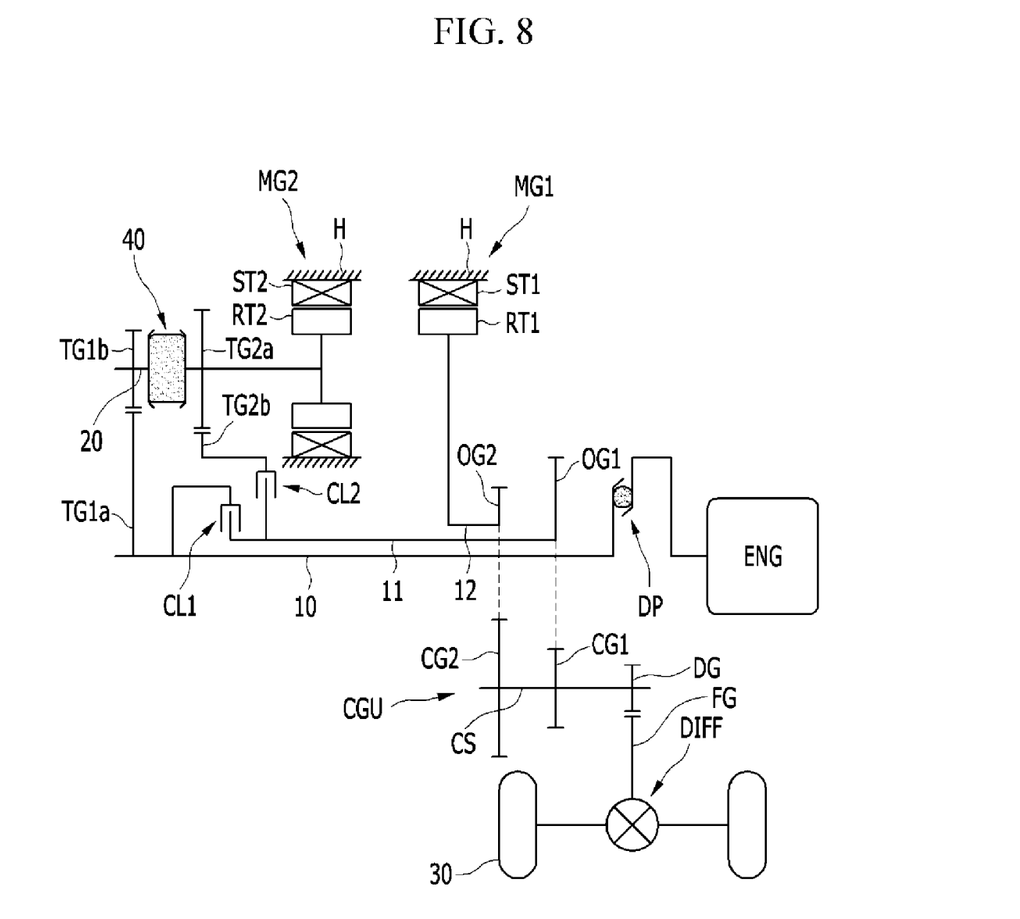
FIG. 8 is a schematic diagram of still another exemplary transmission system of a hybrid electric vehicle according to the present invention.

FIG. 8 is a schematic diagram of a transmission system of a hybrid electric vehicle according to a third exemplary embodiment of the present invention. Referring to FIG. 8, the third exemplary embodiment is obtained by modifying the second exemplary embodiment. That is, the second shaft 20 is divided into two pieces between the first externally-meshing driven gear TG1b and the second externally-meshing drive gear TG2a, and a synchronizer 40 is disposed between the divided two pieces of the second shaft 20.

Therefore, if the second motor/generator MG2 is not operated, the second shaft 20 is divided into the two pieces by the synchronizer 40. Therefore, inertia effect of the second motor/generator MG2 and the second shaft 20 can be prevented.

It is exemplified but is not limited that the synchronizer 40 is disposed between the two pieces of the second shaft 20. That is, any device which can selectively connect the two pieces of the second shaft 20 can be used.

Since functions of the third exemplary embodiment are the same as those of the second exemplary embodiment except whether the synchronizer 40 is used or not, detailed description thereof will be omitted.

Since the exemplary embodiments of the present invention provide various modes, fuel economy may be improved. That is, the EV mode, the continuous mode and the parallel mode including the direct-coupling and the OD can be achieved by disposing two motor/generators and two clutches on the first shaft.

In addition, since the clutch is not used at modes other than the parallel mode, operating pressure applied to the clutches can be minimized and fuel economy may be improved. In addition, since the direct-coupling is added in the parallel mode, fuel economy may be enhanced and capacity of the motor/generator for driving the vehicle may be reduced. In addition, since the motor/generator for generating electricity is disposed on the second shaft and two clutches are disposed in the space attained by removing the planetary gear set, a length of the transmission system may be shortened.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system of a hybrid electric vehicle comprising:
    a first shaft connected to an engine and provided with a first externally-meshing drive gear fixedly disposed thereon;
    a first hollow shaft disposed without rotational interference with the first shaft, selectively connected to the first shaft through a first clutch, and provided with a first output gear;
    a second hollow shaft disposed without rotational interference with the first hollow shaft and provided with a second output gear;
    a second shaft disposed in parallel with the first shaft and provided with a first externally-meshing driven gear fixedly disposed on the second shaft and engaged with the first externally-meshing drive gear and a second externally-meshing drive gear fixedly disposed on the second shaft;
    a second externally-meshing driven gear engaged with the second externally-meshing drive gear and selectively connected to the first hollow shaft through a second clutch;
    a first motor/generator directly and operably connected to the second hollow shaft; and
    a second motor/generator directly and operably connected to the second shaft.

2. The transmission system of claim 1, further comprising:
    a reduction gear unit transmitting torque of the first hollow shaft or the second hollow shaft to a differential apparatus.

3. The transmission system of claim 2, wherein the reduction gear unit comprises:
- an intermediate shaft disposed in parallel with the first shaft between the differential apparatus and the first shaft;
- a first intermediate gear provided on the intermediate shaft and engaged with the first output gear;
- a second intermediate gear provided on the intermediate shaft and engaged with the second output gear; and
- a drive gear provided on the intermediate shaft and engaged with a final reduction gear of the differential apparatus.

4. The transmission system of claim 1, wherein the first and second externally-meshing drive gears and the first and second externally-meshing driven gears are adapted to increase a rotation speed of the first shaft and to selectively transmit the increased rotation speed to the first hollow shaft.

5. The transmission system of claim 1, wherein:
- the first clutch is disposed between the first shaft and the first hollow shaft; and
- the second clutch is disposed between the first hollow shaft and the second externally-meshing driven gear.

6. The transmission system of claim 1, wherein the first motor/generator is used to drive the vehicle and the second motor/generator is used to generate electricity.

7. The transmission system of claim 1, wherein the second motor/generator is disposed on a middle portion of the second shaft.

8. The transmission system of claim 1, wherein the second motor/generator is disposed on one end portion of the second shaft.

9. The transmission system of claim 8, further comprising:
- a variable connection unit dividing the second shaft into two pieces and selectively connecting the divided two pieces.

10. The transmission system of claim 9, wherein the variable connection unit is a synchronizer.

11. The transmission system of claim 1, further comprising a damper disposed between the engine and the first shaft.

12. A transmission system of a hybrid electric vehicle comprising:
- a first shaft connected to an engine and provided with a first externally-meshing drive gear fixedly disposed thereon;
- a first hollow shaft disposed without rotational interference with the first shaft and selectively and operably connected to the first shaft through a first clutch, and provided with a first output gear;
- a second hollow shaft disposed without rotational interference with the first hollow shaft and provided with a second output gear fixedly disposed thereon;
- a second shaft disposed in parallel with the first shaft and provided with a first externally-meshing driven gear fixedly disposed on the second shaft and engaged with the first externally-meshing drive gear and a second externally-meshing drive gear fixedly disposed on the second shaft;
- a second externally-meshing driven gear engaged with the second externally-meshing drive gear and selectively connected to the first hollow shaft through a second clutch;
- a first motor/generator directly and operably connected to the second hollow shaft; and
- a second motor/generator directly and operably connected to the second shaft.

13. The transmission system of claim 12, further comprising a reduction gear unit transmitting torque of the first hollow shaft or the second hollow shaft to a differential apparatus.

14. The transmission system of claim 13, wherein the reduction gear unit comprises:
- an intermediate shaft disposed in parallel with the first shaft between the differential apparatus and the first shaft;
- a first intermediate gear provided on the intermediate shaft and engaged with the first output gear;
- a second intermediate gear provided on the intermediate shaft and engaged with the second output gear; and
- a drive gear provided on the intermediate shaft and engaged with a final reduction gear of the differential apparatus.

15. The transmission system of claim 12, further comprising a variable connection unit dividing the second shaft into two pieces and selectively connecting the divided two pieces.

16. The transmission system of claim 12, further comprising a damper disposed between the engine and the first shaft.

* * * * *